United States Patent
Heiling et al.

(10) Patent No.: US 11,566,919 B2
(45) Date of Patent: Jan. 31, 2023

(54) RESOLVER EXCITATION USING THRESHOLD BAND OF VOLTAGES

(71) Applicant: Infineon Technologies AG, Neubiberg (DE)

(72) Inventors: Christian Heiling, Graz (AT); Thomas Uller, Gnas (AT)

(73) Assignee: Infineon Technologies AG, Neubiberg (DE)

( * ) Notice: Subject to any disclaimer, the term of this patent is extended or adjusted under 35 U.S.C. 154(b) by 81 days.

(21) Appl. No.: 17/149,264

(22) Filed: Jan. 14, 2021

(65) Prior Publication Data
US 2022/0221308 A1    Jul. 14, 2022

(51) Int. Cl.
*G01D 5/20*    (2006.01)
(52) U.S. Cl.
CPC ................... *G01D 5/2073* (2013.01)
(58) Field of Classification Search
CPC .................................................. G01D 5/2073
See application file for complete search history.

(56) References Cited

FOREIGN PATENT DOCUMENTS

KR    2016066923 A    *    6/2016

OTHER PUBLICATIONS

Texas Instrument, "ALM2402-Q1 Dual Op-amp with High Current Output," SLOS912D, revised Jul. 2015, 35 pp.

* cited by examiner

*Primary Examiner* — Walter L Lindsay, Jr.
*Assistant Examiner* — Milton Gonzalez
(74) *Attorney, Agent, or Firm* — Shumaker & Sieffert, P.A.

(57) ABSTRACT

A device for excitation of a resolver comprising an excitation coil and one or more sensing coils includes circuitry. The circuitry is configured to amplify a carrier signal using a first gain value to generate an excitation signal for output to the excitation coil of the resolver and determine whether the excitation signal is outside of a threshold band of voltages. The circuitry is further configured to amplify the carrier signal using a second gain value, wherein the second gain value is generated based on whether the excitation signal is outside of the threshold band of voltages.

14 Claims, 13 Drawing Sheets

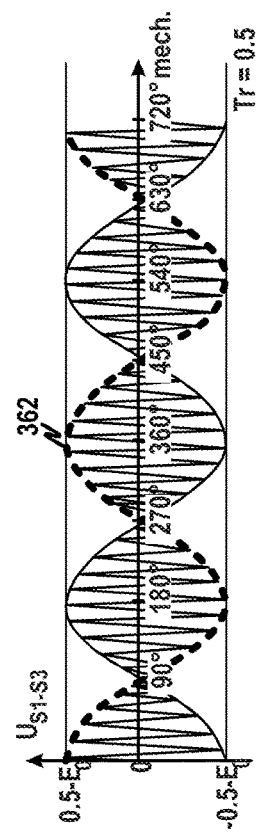
FIG. 3B
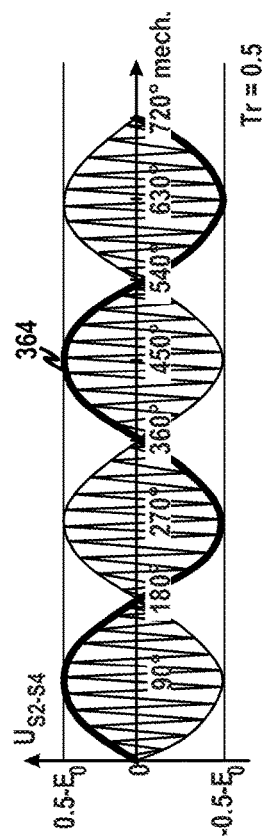
FIG. 3C
FIG. 3D
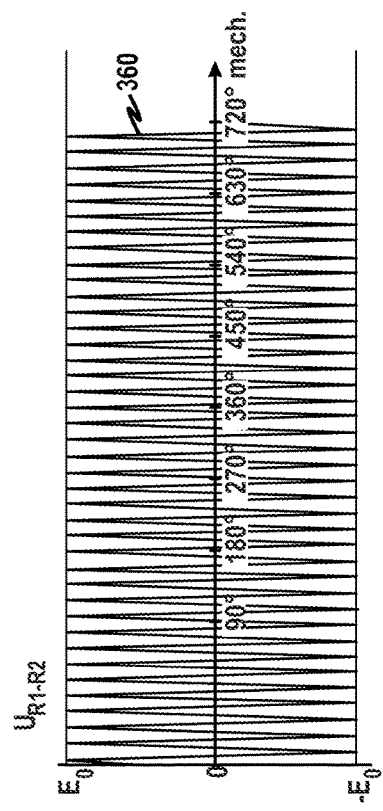
FIG. 3A
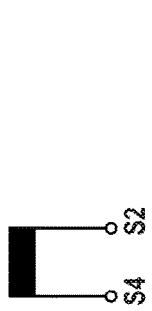
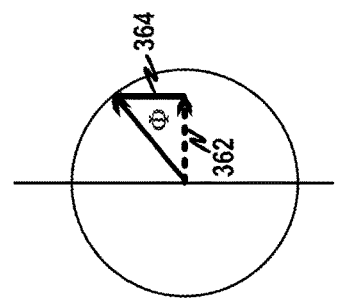
FIG. 3E

RESOLVER EXCITATION USING THRESHOLD BAND OF VOLTAGES

TECHNICAL FIELD

This disclosure relates to excitation for a resolver configured to provide an angular feedback and/or positional feedback for a motor, such as an AC motor or a brushless DC (BLDC) motor.

BACKGROUND

A motor drive system may use angular feedback and/or positional feedback in order to efficiently and accurately drive the motor. A resolver may include an excitation coil, a sine sensing coil, and a cosine sensing coil. The excitation coil may be located on a rotor of the resolver. As the rotor of the resolver spins, the excitation coil may induce a current into the sine sensing coil and cosine sensing coil. The sine sensing coil and cosine sensing coil may be oriented 90 degrees from one another and produce a vector position. The motor drive system may read the vector position generated by the resolver to determine the angular feedback and/or positional feedback of the motor. The motor drive system may drive the motor using the determined angular feedback and/or positional feedback of the motor.

SUMMARY

In general, this disclosure is directed to techniques for improving a signal-to-noise ratio (SNR) for signals of a resolver. Circuitry may be configured to amplify a carrier signal to generate an excitation signal for output to the excitation coil of the resolver with a gain value such that the excitation signal is within a threshold band of voltages. For instance, the circuitry may be configured to amplify a carrier signal to generate an excitation signal that corresponds to a maximum gain within a threshold band of voltages.

In one example, a device for excitation of a resolver comprising an excitation coil and one or more sensing coils includes circuitry configured to amplify a carrier signal using a first gain value to generate an excitation signal for output to the excitation coil of the resolver and determine whether the excitation signal is outside of a threshold band of voltages. The circuitry is further configured to amplify the carrier signal using a second gain value, wherein the second gain value is generated based on whether the excitation signal is outside of the threshold band of voltages.

In another example, a method for excitation of a resolver comprising an excitation coil and one or more sensing coils includes amplifying, by circuitry, a carrier signal using a first gain value to generate an excitation signal for output to the excitation coil of the resolver and determining, by the circuitry, whether the excitation signal is outside of a threshold band of voltages. The method further comprises amplifying, by the circuitry, the carrier signal using a second gain value, wherein the second gain value is determined based on whether the excitation signal is outside of the threshold band of voltages.

In another example, a system for excitation of a resolver comprising an excitation coil and one or more sensing coils includes excitation circuitry and controller circuitry. The excitation circuitry is configured to amplify a carrier signal using a first gain value to generate an excitation signal for output to the excitation coil of the resolver and determine whether the excitation signal is outside of a threshold band of voltages. The excitation circuitry is further configured to output an indication of whether the excitation signal is outside of the threshold band of voltages. The controller circuitry circuit is configured to generate a second gain value in response to the indication of whether the excitation signal is outside of the threshold band of voltages. The excitation circuitry is further configured to amplify the carrier signal using the second gain value.

In one example, an apparatus for excitation of a resolver comprising an excitation coil and one or more sensing coils includes means for amplifying a carrier signal using a first gain value to generate an excitation signal for output to the excitation coil of the resolver and means for determining whether the excitation signal is outside of a threshold band of voltages. The apparatus further comprises means for amplifying the carrier signal using a second gain value, wherein the second gain value is determined based on whether the excitation signal is outside of the threshold band of voltages.

Details of these and other examples are set forth in the accompanying drawings and the description below. Other features, objects, and advantages will be apparent from the description and drawings, and from the claims.

BRIEF DESCRIPTION OF DRAWINGS

FIG. 3A is a conceptual diagram illustrating an example resolver, in accordance with one or more techniques of this disclosure.

FIG. 3B is a graph illustrating an example of an excitation signal, in accordance with one or more techniques of this disclosure.

FIG. 3C is a graph illustrating an example of a cosine excitation signal, in accordance with one or more techniques of this disclosure.

FIG. 3D is a graph illustrating an example of a sine excitation signal, in accordance with one or more techniques of this disclosure.

FIG. 3E is a conceptual diagram illustrating an example of a rotation angle of a motor in relation to a sine sensing signal and a cosine sensing signal, in accordance with one or more techniques of this disclosure.

DETAILED DESCRIPTION

Figure 1:
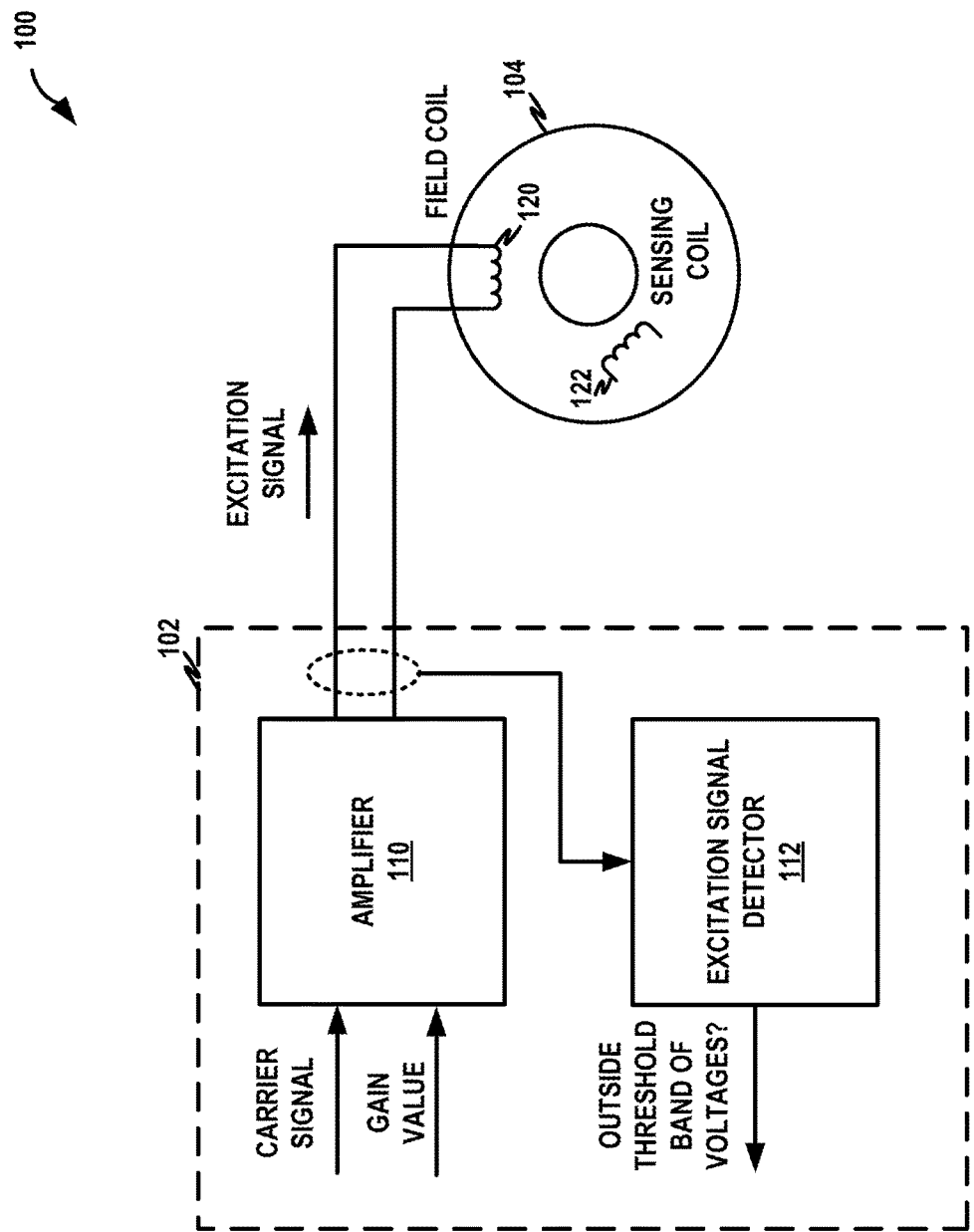
FIG. 1 is a block diagram illustrating an example system configured for excitation of a resolver, in accordance with one or more techniques of this disclosure.

The amplitude of an excitation carrier signal at an excitation coil of a resolver may not directly influence the result of an angle calculation for a motor because the amplitude may cancel out due to a division operation. As such, in order to improve the signal-to-noise ratio (SNR), especially for the zero crossing moments when one amplitude is low, the carrier signal voltage may set to be as large as possible. However, the amplitude may be controlled and kept sufficiently low, in order to avoid any rail saturation effects of the amplifier because the resulting saturation distortions may cause significant disturbances in the excitation signal which may corrupt the angle calculation. Accordingly, some systems may use an amplitude of the excitation carrier signal that is as large as possible and safely below distortion limits of the amplifier.

To avoid distortion, some systems may use discrete devices. For example, a system may use an operational amplifier with a gain set by external resistors that are carefully selected by a technician to precisely define the gain, which may rely on a cost intensive end-of-line calibration. The cost intensive end-of-line calibration may significantly add to a cost and size of a resulting product. Moreover, due to the existing uncertainties, the system may use a guard-band comprising relatively large margins at all times in order to avoid the generation of distortions in the carrier amplifier. As a result, a usable excitation voltage range may be reduced to account for uncertainties in the system.

In accordance with the techniques of the disclosure, a system may include elements for a resolver excitation voltage generation system which may allow the system itself to recognize that saturation distortions are present in the system. Using the information on whether the saturation distortion are present, the system (e.g. a micro-controller) can adjust a gain for amplifying the excitation signal such that a voltage amplitude represents an optimum combination of a highest possible amplitude that is free of saturation effects.

For example, the system may include two comparators which may monitor a voltage of an excitation signal and compare the voltage of the excitation signal to thresholds close to the supply voltage rails (e.g., a high voltage rail and a low voltage rail). When the voltage of the excitation signal is outside one of these thresholds, the comparators may indicate that a saturation distortion has occurred to a digital circuit.

In some examples, analog peak detection circuits may be used to capture a maximum and minimum amplitude measured at the excitation signal during a defined period of time. In this way, the analog peak detection circuitry may measure peak level voltages using a sampling analog-to-digital converter (ADC) either by multiplexing both (or more) values into one ADC or by individual ADCs. Circuitry may use the digitized values for further digital processing and provide the digitized values, for example, to controller circuitry, to indicate whether a saturation distortion has occurred.

FIG. 1 is a block diagram illustrating an example system configured for excitation of a resolver 104, in accordance with one or more techniques of this disclosure. As illustrated in this example of FIG. 1, system 100 may include circuitry 102 and resolver 104. Circuitry 102 may be configured for excitation of an excitation coil 120. Circuitry 102 may include an amplifier 110 and an excitation signal detector 112. Circuitry 102 may include analog circuitry, digital circuitry, or analog circuitry and digital circuitry. Circuitry 102 may be formed in a single integrated circuit. For example, circuitry 102 may include amplifier 110 comprising a programmable operation amplifier and excitation signal detector 112 such that amplifier 110 may operate with a programmable gain without resistors external to the single integrated circuitry formed by circuitry 102.

Amplifier 110 may be configured to amplify a carrier signal to generate an excitation signal for output to excitation coil 120 of resolver 104. Amplifier 110 may be formed using an operational amplifier, for example, a programmable gain operational amplifier. As described further herein, the carrier signal may be generated using a carrier generator or another device. The gain value may be generated by controller circuitry. In some examples, circuitry 102 may generate the gain value.

Excitation signal detector 112 may be configured to determine whether the excitation signal is outside of a threshold band of voltages. For example, excitation signal detector may be configured to output an indication of whether the excitation signal is outside of the threshold band of voltages. Excitation signal detector 112 may include one or more comparators configured to indicate whether the excitation signal comprises a voltage greater than a first rail and/or a voltage less than a second rail (e.g., a ground rail). In some examples, excitation signal detector 112 may be configured to determine a maximum voltage of the excitation signal during a predetermined period of time and/or determine a minimum voltage of the excitation signal during the predetermined period of time. Excitation signal detector 112 may output the indication of whether the excitation signal is outside of the threshold band of voltages to controller circuitry. In some examples, excitation signal detector 112 may output the indication of whether the excitation signal is outside of the threshold band of voltages to another component of circuitry 102.

In accordance with the techniques of the disclosure, amplifier 110 may amplify a carrier signal using a first gain value to generate an excitation signal for output to the excitation coil of resolver 104. For example, amplifier 110 may be configured to output the carrier signal into an input of a programmable operation amplifier of amplifier 110 and set a gain of the programmable gain operation amplifier to the first gain value.

Excitation signal detector 112 may determine whether the excitation signal is outside of a threshold band of voltages.

For example, excitation signal detector 112 may determine whether the excitation signal is outside of a threshold band of voltages using one or more comparators. In some examples, excitation signal detector 112 may determine whether the excitation signal is outside of a threshold band of voltages using one or more peak detectors.

Amplifier 110 may amplify the carrier signal using a second gain value. For example, amplifier 110 may be configured to output the carrier signal into an input of a programmable operation amplifier of amplifier 110 and set a gain of the programmable gain operation amplifier to the second gain value. The second gain value may be generated based on whether the excitation signal is outside of the threshold band of voltages. Circuitry 102 may itself generate the second gain value based on whether the excitation signal is outside of the threshold band of voltages. For example, circuitry 102 may generate the second gain to be less than the first gain when a voltage of the excitation signal exceeds a combination of a first supply voltage and a first threshold or when the voltage of the excitation signal is less than a second supply voltage minus a second threshold.

In some examples, circuitry 102 may output an indication of the excitation signal is outside of the threshold band of voltages to other circuitry, which may generate the second gain. For example, circuitry 102 may output, to controller circuitry, an indication that the excitation signal is outside of the threshold band of voltages. The controller circuitry may generate the second gain value based on whether the excitation signal is outside of the threshold band of voltages. For example, the controller circuitry may generate the second gain to be less than the first gain when the excitation signal is outside of the threshold band of voltages. In this example, circuitry 102 may receive, from the controller circuitry, an indication of the second gain value.

Figure 2:
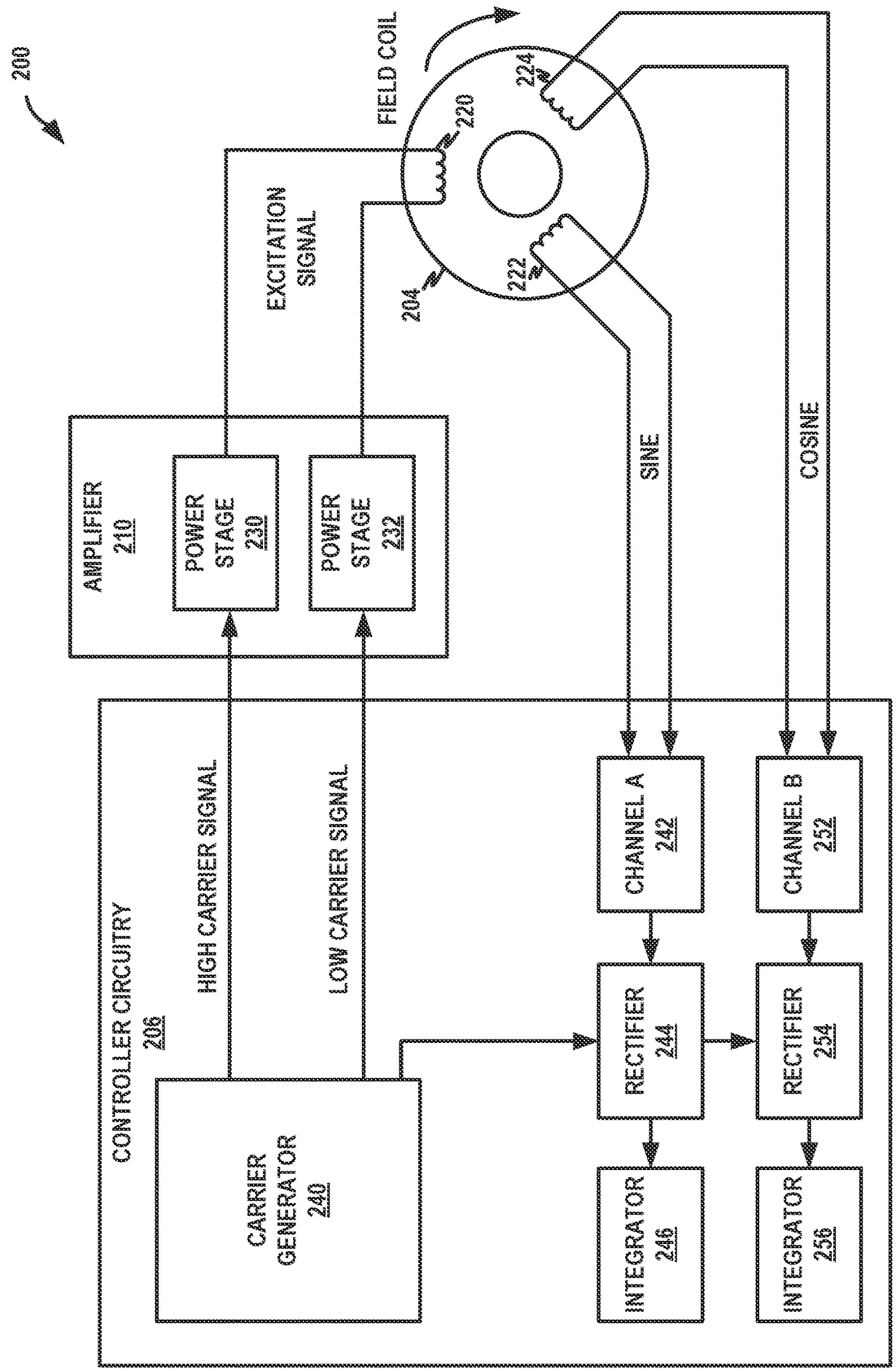
FIG. 2 is a conceptual diagram illustrating an example of controller circuitry and an amplifier configured for excitation of a resolver, in accordance with one or more techniques of this disclosure.

FIG. 2 is a conceptual diagram illustrating an example of controller circuitry 206 and an amplifier 210 configured for excitation of a resolver 204, in accordance with one or more techniques of this disclosure. In the example of FIG. 2, resolver 204 may include an excitation coil 220, a sine sensing coil 222, and a cosine sensing coil 224.

High power AC motor or a brushless DC (BLDC) motor drive applications may use an angular feedback and positional feedback in order to efficiently and accurately drive a motor. Some systems may use optical encoders, hall sensors, or resolvers for positional feedback. Examples described herein may use resolver 204 for positional feedback. Resolver 204 may be used, for example, when environmental or longevity are challenging and extensive. Resolver 204 may act like a transformer with one primary coil (e.g., excitation coil 220) and two secondary coils (e.g., sine sensing coil 222 and cosine sensing coil 224). Excitation coil 220 may be rigidly connected to a rotor of resolver 204. As the rotor of resolver 204 spins, excitation coil 220 may induce a current into sine sensing coil 222 and cosine sensing coil 224. Sine sensing coil 222 and cosine sensing coil 224 may be oriented 90 degrees from one another and produce a vector position read by controller circuitry 206 (e.g., a resolver to digital converter chip). Excitation coil 220 may have a very low DC resistance (e.g., less than 100Ω), which may result in a current sink and a current source of up to 200 mA from amplifier 210 (e.g., an excitation driver).

Controller circuitry 206 may include a carrier generator 240 configured to generate a carrier signal. The carrier signal may be output as a low carrier signal and a high carrier signal. Channel A 242 may be configured to receive a sine sensing signal from sine sensing coil 222. Rectifier 244 may be configured to rectify the sine sensing signal with the carrier frequency of the carrier signal to generate a rectified sine signal. Integrator 246 may be configured to integrate half-cycles of the carrier frequency to apply filtering of the rectified sine signal to generate an integrated sine signal. Similarly, channel B 252 may be configured to receive a cosine sensing signal from cosine sensing coil 224. Rectifier 254 may be configured to rectify the cosine sensing signal with the carrier frequency of the carrier signal to generate a rectified cosine signal. Integrator 256 may be configured to integrate half-cycles of the carrier frequency to apply filtering of the rectified cosine signal to generate an integrated cosine signal.

Controller circuitry 206 may include a microcontroller formed on a single integrated circuit containing a processor core, memory, inputs, and outputs. For example, controller circuitry 206 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Amplifier 210 may include power stage 230 and power stage 232. Power stage 230 may be configured to amplify the high carrier signal output by carrier generator 240. Power stage 232 may be configured to amplify the low carrier signal output by carrier generator 240. As described further herein, the combination of the outputs of power stage 230 and power stage 232 may generate the excitation signal for output to excitation coil 220 of resolver 204.

In accordance with the techniques of the disclosure, amplifier 210 may, rather than rely on external resistors to define a fixed gain that are selected by a technician, be configured to modify a gain applied to the high carrier signal and the low carrier signal such that the excitation signal is generated at a maximum amplitude that is free of saturation effects. In this way, system 200 may generate the excitation signal with a highest SNR, which may improve an accuracy of the calculating the angle of resolver 204.

FIG. 3A is a conceptual diagram illustrating an example resolver 304, in accordance with one or more techniques of this disclosure. Resolver 304 receives an excitation signal at nodes R1 and R2 for an exciter coil to deliver the driving voltage. Resolver 304 may output a sine sensing signal representing the excitation signal multiplied by $\sin(\phi)$ at nodes S1 and S2 and a cosine sensing signal representing the excitation signal multiplied by $\cos(\phi)$ at nodes S3 and S4, with $\phi$=rotation angle of a motor). The sine sensing signal and/or the cosine sensing signal may be directly handled by a controller circuitry.

FIG. 3B is a graph illustrating an example of an excitation signal 360, in accordance with one or more techniques of this disclosure. Excitation signal 360 may be generated by amplifying, by amplifier 210, a carrier signal generated by carrier generator 240. Excitation signal 360 may be received at nodes R1 and R2 of resolver 304.

FIG. 3C is a graph illustrating an example of a sine sensing signal 362, in accordance with one or more techniques of this disclosure. Sine sensing signal 362 may be output at nodes S1 and S2 of resolver 304.

FIG. 3D is a graph illustrating an example of a cosine sensing signal 364, in accordance with one or more techniques of this disclosure. Cosine sensing signal 364 may be output at nodes S3 and S4 of resolver 304.

FIG. 3E is a conceptual diagram illustrating an example of a rotation angle of a motor in relation to sine sensing signal 362 and cosine sensing signal 364, in accordance with one or more techniques of this disclosure. As shown, the position (φ) may be determined by applying an arctan function (e.g., an inverse of a tangent function) of the result of sine sensing signal 362 divided by the cosine sensing signal 364.

Figure 4:
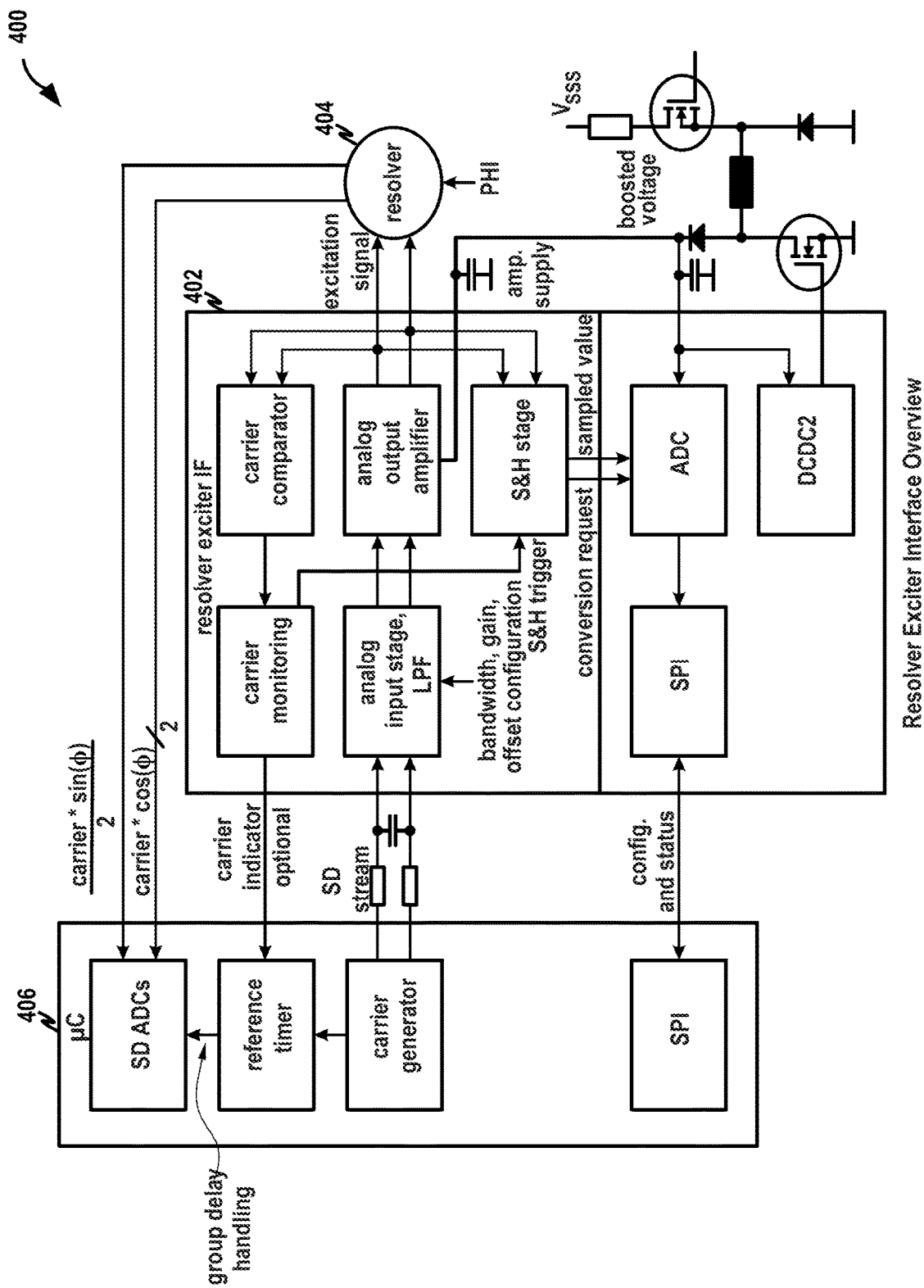
FIG. 4 is a conceptual diagram illustrating an example of a resolver exciter interface, in accordance with one or more techniques of this disclosure.

FIG. 4 is a conceptual diagram illustrating an example of a resolver exciter interface, in accordance with one or more techniques of this disclosure. System 400 may include a resolver exciter interface (IF) 402, a resolver 404, and a microcontroller (μC) 406.

Microcontroller 406 may generate a carrier signal. Resolver exciter interface 402 may receive the carrier signal at an analog input stage and low-pass filter (LPF), and apply an analog output amplifier using bandwidth, gain, and offset configuration information to generate an excitation signal. Resolver 404 receives the excitation signal and generates, based on a position of a rotor of resolver 404 that is rigidly coupled to a rotor of a motor, a sine sensing signal (e.g., (carrier*sin(φ))/2) and a cosine sensing signal (e.g., (carrier*cos(φ))/2)). In this example, microcontroller 406 may read, with an ADC (e.g., a sigma-delta ADC), the sine sensing signal and the cosine sensing signal to determine the position of the rotor of resolver 404. Microcontroller 406 may drive a motor using the position of the rotor of resolver 404. As shown, system 400 may be configured to include additional circuitry. For instance, system 400 may include a voltage supply to provide a boosted voltage and a serial peripheral interface (SPI) for communication between microcontroller 406 and resolver exciter interface 402.

Microcontroller 406 may include a microcontroller formed on a single integrated circuit containing a processor core, memory, inputs, and outputs. For example, Microcontroller 406 may include one or more processors, including one or more microprocessors, DSPs, ASICs, FPGAs, or any other equivalent integrated or discrete logic circuitry, as well as any combinations of such components.

Figure 5:
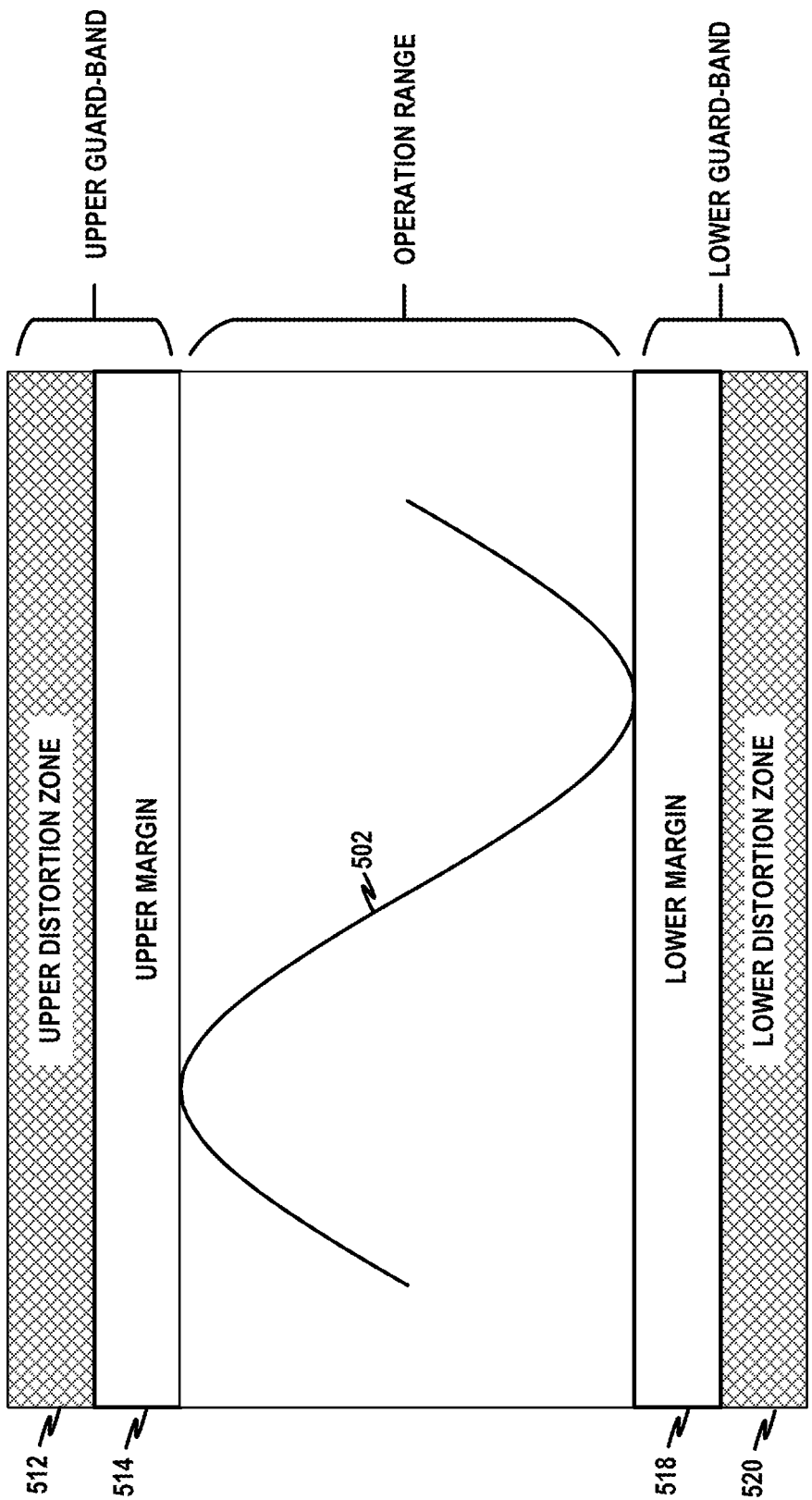
FIG. 5 is a graph illustrating an example of an excitation signal, an upper distortion zone, and a lower distortion zone, in accordance with one or more techniques of this disclosure.

FIG. 5 is a graph illustrating an example of an excitation signal 502, an upper distortion zone 512, and a lower distortion zone 520, in accordance with one or more techniques of this disclosure. FIG. 5 shows a visualization of excitation signal 502 that is distortion free.

Some systems may use an operational amplifier with a single gain set by external resistors, where the single gain is set to include relatively large margins to account for uncertainties in the system. Accordingly, such systems may include an upper margin 514 and a lower margin 518 that are relatively large to help to avoid the generation of distortions in excitation signal 502 (e.g., the excitation signal 502 extending into the upper distortion band 512 and/or the lower distortion band 520). The combination of upper distortion zone 512 and upper margin 514 may be referred to herein as an "upper guard-band." Similarly, the combination of lower distortion zone 520 and lower margin 518 may be referred to herein as a "lower guard-band." However, systems relying on margin 514 and lower margin 518 that are relatively large may reduce a usable excitation signal range (illustrated as "operation range").

In accordance with the techniques of the disclosure, a device (e.g., circuitry 102) for excitation of a resolver may amplify a carrier signal using a gain that is generated based on whether excitation signal 502 is outside of a threshold band of voltages (e.g., outside the upper guard-band and the lower guard-band). For example, the device may lower a gain when excitation signal 502 is within the upper guard-band formed by upper distortion zone 512 and upper margin 514 and/or the lower guard-band formed by lower distortion zone 520 and lower margin 518. In some examples, the device may increase the gain when excitation signal 502 is not within the upper guard-band and the lower guard-band. Setting the gain based on whether excitation signal 502 is outside of the threshold band of voltages may help to reduce the size of upper margin 514 and lower margin 518 compared to systems that rely on a single gain value or may allow the device to omit upper margin 514 and lower margin 518. Reducing the size of upper margin 514 and lower margin 518 or omitting upper margin 514 and lower margin 518 may increase a size of the operating range for excitation signal 502, which may improve the signal-to-noise ratio (SNR) for excitation signal 502.

Figure 6:
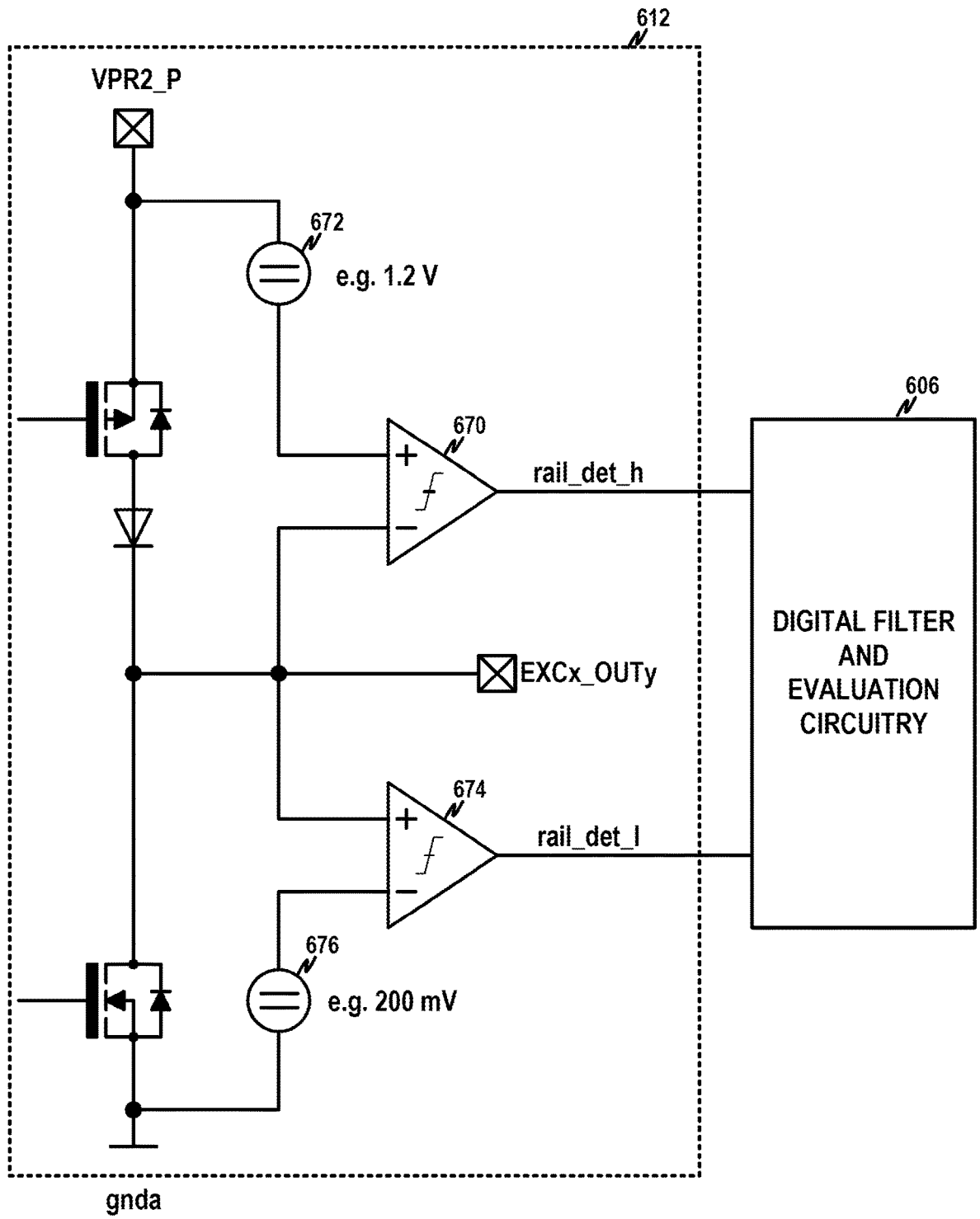
FIG. 6 is a circuit diagram illustrating first example circuitry configured to determine whether an excitation signal is outside of a threshold band of voltages, in accordance with one or more techniques of this disclosure.

FIG. 6 is a circuit diagram illustrating first example circuitry 612 configured to determine whether an excitation signal is outside of a threshold band of voltages, in accordance with one or more techniques of this disclosure. Circuitry 612 may be included in excitation signal detector 112 of FIG. 1. In the example of FIG. 6, circuitry 612 may include a first comparator 670, first guard-band element 672, and a second comparator 674, and second guard-band element 676. Digital filter and evaluation circuitry 606 may be an example of controller circuitry.

In accordance with the techniques of the disclosure, circuitry 612 may help to ensure a voltage of the excitation signal does not comprise saturation distortions. For example, circuitry 612 may include first comparator 670 and second comparator 674, which may help to allow a system controller (e.g., a micro-controller) to detect the presence of a distortions and/or to detect that the system is entering an operating area in which such distortions are likely to occur.

FIG. 6 shows an example of an output stage of a resolver excitation output amplifier (e.g., with a programmable gain). At the output, circuitry 612 includes first comparator 670 and second comparator 674 to monitor the excitation signal and compare a voltage of the excitation signal to thresholds close to the supply voltage rails. In the example of FIG. 6, VPR2_P may represent a high supply and gnda (e.g., ground) may represent a low supply voltage. When the excitation voltage extends beyond the high supply provided by VPR2_P and/or the low supply voltage provided by gnda, first comparator 670 and/or second comparator 674 may indicate that an excitation signal is outside of a threshold band of voltages to digital filter and evaluation circuitry 606.

Circuitry 612 may determine whether a voltage of the excitation signal exceeds a combination of a first supply voltage (e.g., VPR2P) and a first guard-band voltage. Similarly, circuitry 612 may determine whether the voltage of the excitation signal is less than a second supply voltage (e.g., gnda) minus a second guard-band voltage.

For example, circuitry 612 may be configured to output the excitation signal to a first input (e.g., a negative terminal) of first comparator 670. Circuitry 612 may be configured to output a first supply voltage to a second input (e.g., a positive terminal) of first comparator 670. Circuitry 612 may be configured to apply, with first guard-band element 672, a first guard-band voltage (e.g., 1.2 V) that offsets a voltage at the first input of first comparator 670 or a voltage at the second input of first comparator 670. For instance, as shown in FIG. 6, first guard-band element 672 generates first guard-band voltage (e.g., 200 mV) to offset a voltage at the first input of first comparator 670.

First guard-band element 672 may comprise a resistor and a reference constant current source to generate a voltage drop. In some examples, first guard-band element 672 may comprise a bias current and a bipolar diode to generate a reference voltage drop. First guard-band element 672 may comprise a bias current and a metal-oxide-semiconductor (MOS) diode to generate a MOS threshold based reference current drop. However, first guard-band element 672 may generate a first guard-band voltage using any other means of generating a constant reference voltage drop such as, for example, bandgaps, reference regulators, or another guard-band element.

Similarly, circuitry 612 may be configured to output the excitation signal to a first input (e.g., a positive terminal) of second comparator 674. Circuitry 612 may be configured to output a second supply voltage to a second input (e.g., a negative terminal) of second comparator 674. Circuitry 612 may be configured to apply, with second guard-band element 676, a second guard-band voltage (e.g., 200 mV) that offsets a voltage at the first input of second comparator 674 or a voltage at the second input of second comparator 674. For instance, as shown in FIG. 6, second guard-band element 676 generates second guard-band voltage (e.g., 200 mV) to offset a voltage at the second input of second comparator 674.

Second guard-band element 676 may comprise a resistor and a reference constant current source to generate a voltage drop. In some examples, second guard-band element 676 may comprise a bias current and a bipolar diode to generate a reference voltage drop. Second guard-band element 676 may comprise a bias current and a MOS diode to generate a MOS threshold based reference current drop. However, second guard-band element 676 may generate a second guard-band voltage using any other means of generating a constant reference voltage drop such as, for example, bandgaps, reference regulators, or another guard-band element.

First comparator 670 may output, to controller circuitry (e.g., digital filter and evaluation circuitry 606) a high rail detection signal (e.g., rail_det_h) indicating that the excitation signal is in an upper distortion zone in response to determining that the excitation signal exceeds the threshold band of voltages. Similarly, second comparator 674 may output, to the controller circuitry, a low rail detection signal (e.g., rail_det_l) indicating that the excitation signal is in a lower distortion zone in response to determining that the excitation signal is less than the threshold band of voltages.

Digital filter and evaluation circuitry 606 may perform signal processing as described further below. Digital filter and evaluation circuitry 606 may include a blanking time counter to suppress error indications right after start-up or enabling the amplifier. In some examples, digital filter and evaluation circuitry 606 may perform filtering to allow for short period violations (e.g., without error indication, e.g. for spikes or voltage drops). Digital filter and evaluation circuitry 606 may perform latching in order to remember violation events beyond one period. Digital filter and evaluation circuitry 606 may perform any combination of blanking time counting, filtering, and/or latching.

Figure 7:
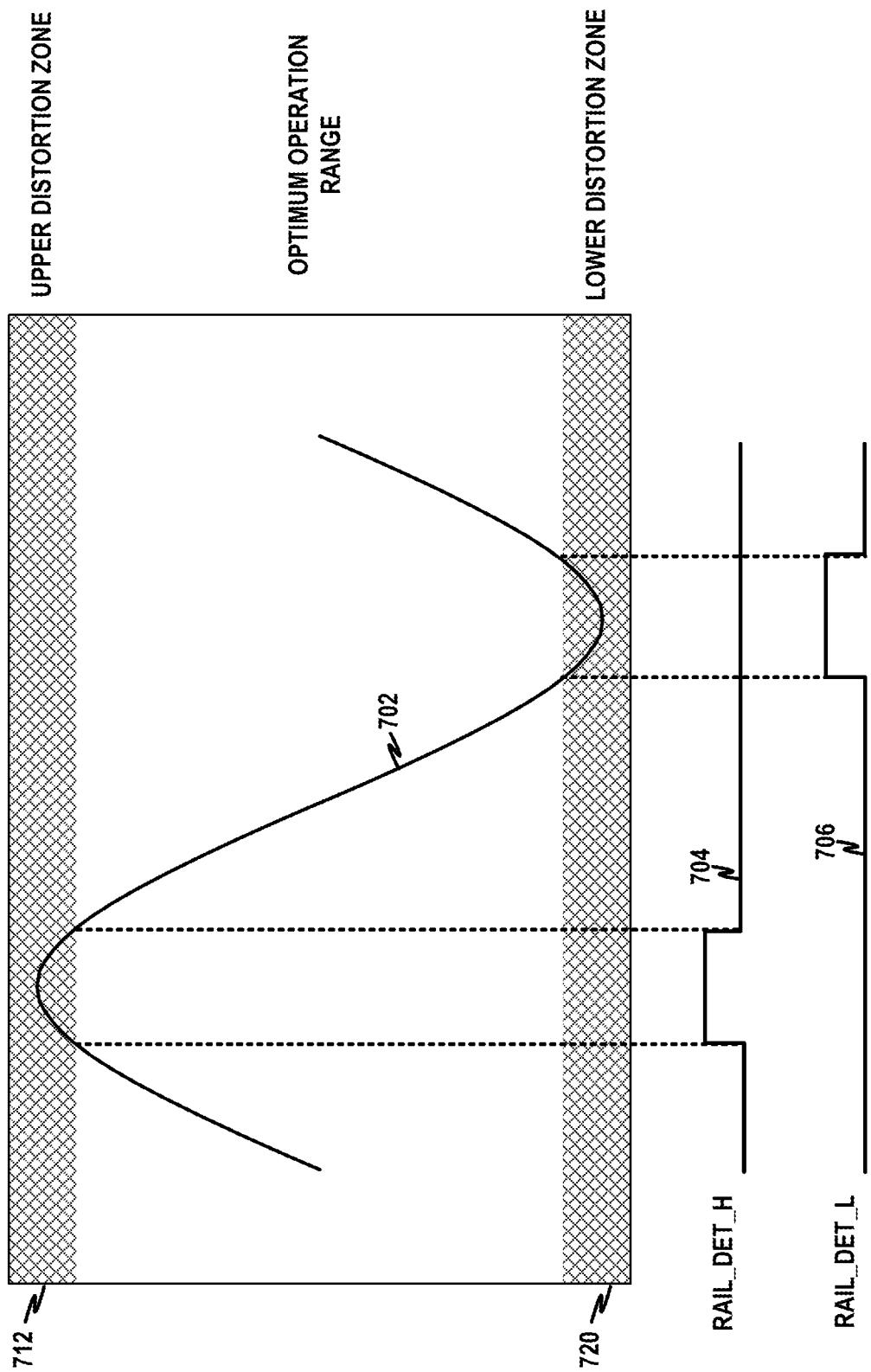
FIG. 7 is a graph illustrating an example of an excitation signal, a high rail detection signal, and a low rail detection signal, in accordance with one or more techniques of this disclosure.

FIG. 7 is a graph illustrating an example of an excitation signal 702, a high rail detection signal 704, and a low rail detection signal 706, in accordance with one or more techniques of this disclosure. FIG. 7 shows an example excitation signal 702, which is exceeding the limits of the linear operation range (e.g., within upper distortion zone 712 and/or lower distortion zone 720) of a power amplifier with programmable gain.

In the example of FIG. 7, a first comparator (e.g., first comparator 670) may output, to controller circuitry high rail detection signal 704 (e.g., rail_det_h) indicating that the excitation signal is in an upper distortion zone (e.g., a logical '1') in response to determining that the excitation signal exceeds the threshold band of voltages. Similarly, a second comparator (e.g., second comparator 674) may output, to the controller circuitry, a low rail detection signal (e.g., rail_det_l) indicating that the excitation signal is in a lower distortion zone (e.g., a logical '1') in response to determining that the excitation signal is less than the threshold band of voltages.

Figure 8:
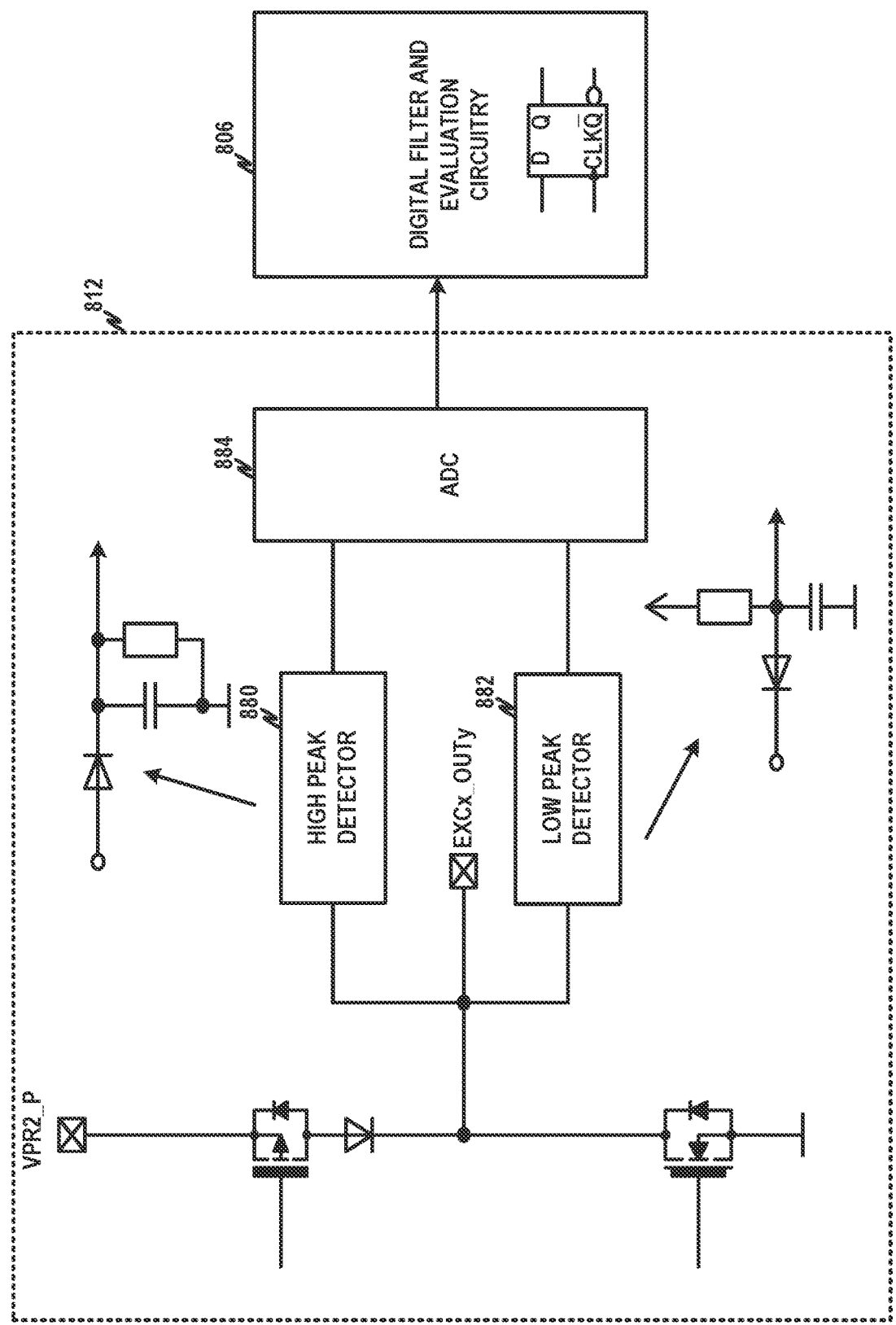
FIG. 8 is a circuit diagram illustrating second example circuitry to determine whether the excitation signal is outside of the threshold band of voltages, in accordance with one or more techniques of this disclosure.

FIG. 8 is a circuit diagram illustrating second example circuitry 812 to determine whether an excitation signal is outside of the threshold band of voltages, in accordance with one or more techniques of this disclosure. As shown, circuitry 812 may include a high peak detector 880, low peak detector 882, and ADC 884. Digital filter and evaluation circuitry 806 may be an example of controller circuitry.

In the example of FIG. 8, high peak detector 880 may be configured to capture a maximum amplitude measured at the output of the power amplifier during a defined period of time (e.g., using a discharge resistor of high peak detector 880 arranged in parallel with a capacitor). Similarly, low peak detector 882 may be configured to capture a minimum amplitude measured at the output of the power amplifier during the defined period of time (e.g., using a discharge resistor of low peak detector 882 arranged in parallel with a capacitor).

ADC 884 may sample the capture maximum amplitude and minimum amplitudes during the defined period of time. For example, ADC 884 may multiplex both (or more) of the maximum amplitude and minimum amplitudes values into one ADC (as shown in FIG. 8) or by individual ADCs (not shown). ADC 884 may generate digitized values of the maximum amplitude and minimum amplitudes, which may be subsequently used for further digital processing and provided to digital filter and evaluation circuitry 806 for determining a saturation indication (e.g., whether the excitation signal is outside of the threshold band of voltages).

The techniques using a first comparator and a second comparator illustrated in FIG. 6 and the techniques illustrated in FIG. 8 may be used separately, or in combination, to monitor high and low level saturations at the same time, or to monitor only one supply rail. However, monitoring a high rail level and a low rail level may allow for diagnosis in the case of common mode potential (e.g., idle potential) faults.

In accordance with the techniques of the disclosure, high peak detector 880 may determine a maximum voltage of the excitation signal during a predetermined period of time. ADC 884 may sample one or more maximum amplitude values generated by high peak detector 880 to generate an indication of a maximum voltage. ADC 884 may output, to controller circuitry, an indication of the maximum voltage.

Similarly, low peak detector 882 may determine a minimum voltage of the excitation signal during the predetermined period of time. ADC 884 may sample one or more minimum amplitudes values generated by low peak detector 882 to generate an indication of a minimum voltage. ADC 884 may output, to digital filter and evaluation circuitry 806, an indication of the minimum voltage.

Circuitry 812 (e.g., an amplifier of circuitry 812) may receive, from digital filter and evaluation circuitry 806, an indication of a gain value (e.g., a second gain value). For instance, digital filter and evaluation circuitry 806 may generate the gain value based on the maximum voltage, the minimum voltage, or both the maximum voltage and the minimum voltage. In some examples, however, circuitry 812 may be configured to determine a gain value (e.g., a second gain value) based on the maximum voltage, the minimum voltage, or both the maximum voltage and the minimum voltage. In some examples, circuitry 812 may determine the gain value and digital filter and evaluation circuitry 806 may be bypassed.

Figure 9:
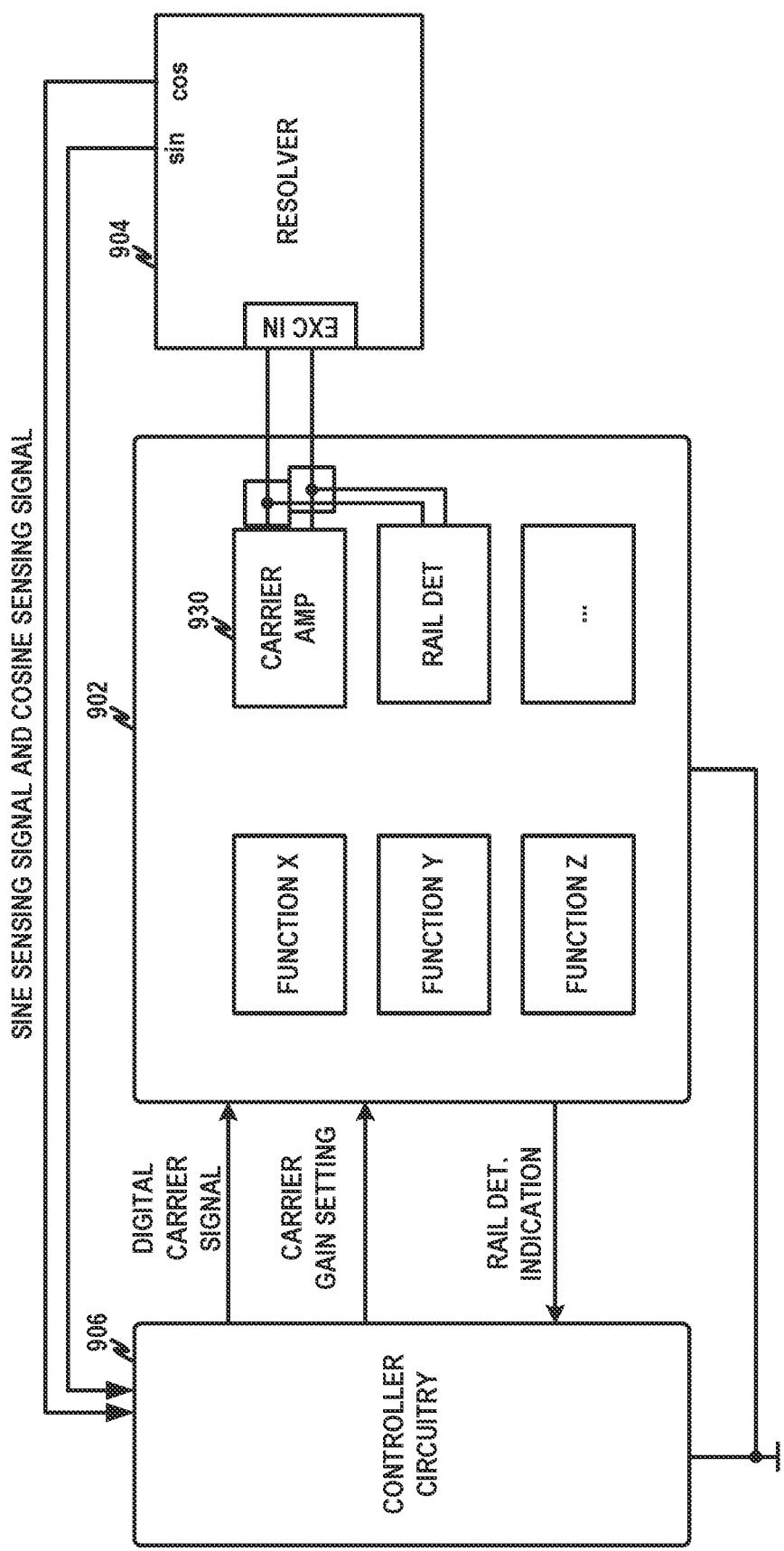
FIG. 9 is a conceptual diagram illustrating an example of controller circuitry configured to generate a digital carrier signal for excitation of a resolver, in accordance with one or more techniques of this disclosure.

FIG. 9 is a conceptual diagram illustrating an example of controller circuitry 906 configured to generate a digital carrier signal for excitation of a resolver 904, in accordance with one or more techniques of this disclosure. In the example of FIG. 9, controller circuitry 906 may receive a sine sensing signal and a cosine sensing signal from resolver 904. In this example, controller circuitry 906 may determine a position for a motor using the sine sensing signal and a cosine sensing signal. Controller circuitry 906 may generate a digital carrier signal. In the example of FIG. 9, controller circuitry 906 may receive a rail detection indication (e.g., rail_det_h and/or rail_det_l) and generate the carrier gain setting based on the rail detection indication. In some examples, however, controller circuitry 906 may receive an indication of a peak (e.g., digitized values of the maximum amplitude and minimum amplitudes) and generate the carrier gain setting based on the digitized values of the maximum amplitude and minimum amplitudes.

In addition, or alternatively, to using comparators (e.g., see FIG. 6) and/or using peak detectors (see FIG. 8), controller circuitry 906 may be configured to generate a gain value (e.g., a second gain value) for the excitation signal based on a first amplitude of the sine sensing signal at a sine sensing coil of resolver 904, a second amplitude of a cosine sensing signal at a cosine sensing coil of resolver 904, or both the first amplitude and the second amplitude.

Circuitry 902 may include a carrier amplifier 930 configured to generate an excitation signal based on the carrier gain setting. For example, carrier amplifier 930 may be configured to output the carrier signal into an input of a programmable operation amplifier of carrier amplifier 930 and set a gain of the programmable gain operation amplifier to the carrier setting gain value.

Controller circuitry 906 may host and use information relating to the excitation carrier amplitude in order to optimize an operation of resolver 904. The feedback information provided by the rail detection circuit of circuitry 902 may allow controller circuitry 906 to adjust the carrier amplitude to the achievable or reasonable maximum and hence to tune resolver 904 to an operating point with maximum signal integrity and best accuracy. Additionally, controller circuitry 906 may adjust an amplitude of the excitation signal to avoid voltages that may result in harmonic distortions in the excitation signal, excessive power dissipation in the excitation signal, or both harmonic distortions and excessive power dissipation in the excitation signal.

Controller circuitry 906 may include a microcontroller formed on a single integrated circuit containing a processor core, memory, inputs, and outputs. For example, controller circuitry 906 may include one or more processors, including one or more microprocessors, DSPs, ASICs, FPGAs, or any other equivalent integrated or discrete logic circuitry, as well as any combinations of such components.

Figure 10:
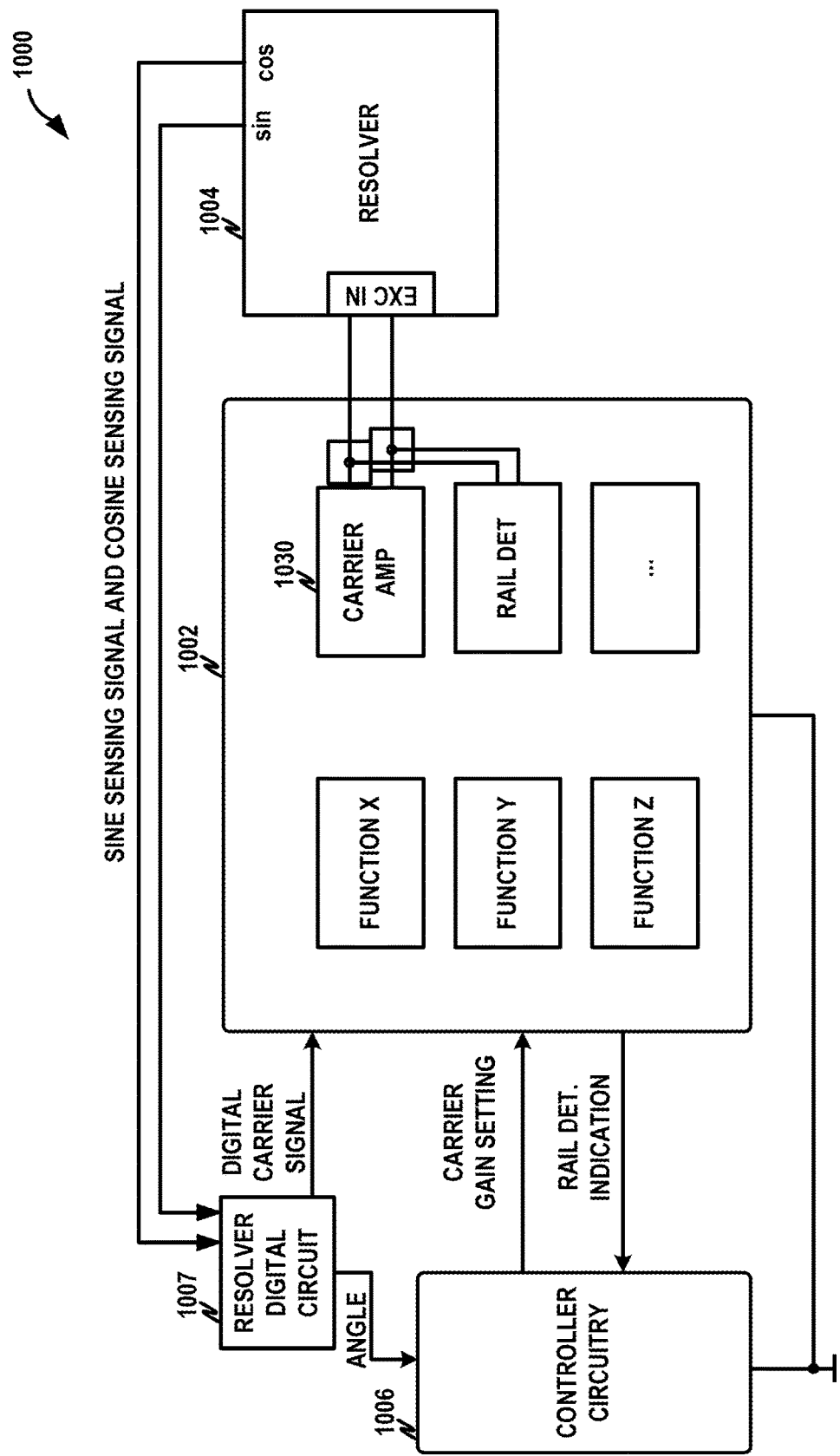
FIG. 10 is a conceptual diagram illustrating an example of controller circuitry for excitation of a resolver and resolver digital circuit configured to generate a digital carrier signal, in accordance with one or more techniques of this disclosure.

FIG. 10 is a conceptual diagram illustrating an example of controller circuitry 1006 for excitation of a resolver 1004 and resolver digital circuitry 1007 configured to generate a digital carrier signal, in accordance with one or more techniques of this disclosure.

In contrast to FIG. 9, system 1000 illustrated in FIG. 10 can use any automotive (or non-automotive) micro-controller to implement controller circuitry 1006 in combination with resolver digital circuitry 1007 (e.g., a resolver-to-digital converter device). Resolver digital circuitry 1007 may generate a low voltage carrier signal and calculate a rotational angle based on a sine sensing signal and a cosine sensing signal. Controller circuitry 1006 may retrieve a digital representation of the motor angle from resolver digital circuitry 1007 by reading out dedicated data registers.

In the example of FIG. 10, controller circuitry 1006 may receive a rail detection indication (e.g., rail_det_h and/or rail_det_l) and generate the carrier gain setting based on the rail detection indication. In some examples, however, controller circuitry 1006 may receive an indication of a peak (e.g., digitized values of the maximum amplitude and minimum amplitudes) and generate the carrier gain setting based on the digitized values of the maximum amplitude and minimum amplitudes.

In addition, or alternatively, to using comparators (e.g., see FIG. 6) and/or using peak detectors (see FIG. 8), controller circuitry 1006 may be configured to generate a gain value (e.g., a second gain value) for the excitation signal based on a first amplitude of the sine sensing signal at a sine sensing coil of resolver 1004, a second amplitude of a cosine sensing signal at a cosine sensing coil of resolver 1004, or both the first amplitude and the second amplitude.

Circuitry 1002 may include a carrier amplifier 1030 configured to generate an excitation signal based on the carrier gain setting. For example, carrier amplifier 1030 may be configured to output the carrier signal into an input of a programmable operation amplifier of carrier amplifier 1030 and set a gain of the programmable gain operation amplifier to the carrier setting gain value.

Controller circuitry 1006 may host and use information relating to the excitation carrier amplitude in order to optimize an operation of resolver 1004. The feedback information provided by the rail detection circuit of circuitry 1002 may allow controller circuitry 1006 to adjust the carrier amplitude to the achievable or reasonable maximum and hence to tune resolver 1004 to an operating point with maximum signal integrity and best accuracy. Additionally, controller circuitry 1006 may adjust the carrier amplitude to avoid excitation signal voltages that may result in harmonic distortions in the excitation signal, excessive power dissipation in the excitation signal, or both harmonic distortions and excessive power dissipation in the excitation signal.

Controller circuitry 1006 may include a microcontroller formed on a single integrated circuit containing a processor core, memory, inputs, and outputs. For example, controller circuitry 1006 may include one or more processors, including one or more microprocessors, DSPs, ASICs, FPGAs, or any other equivalent integrated or discrete logic circuitry, as well as any combinations of such components.

Figure 11:
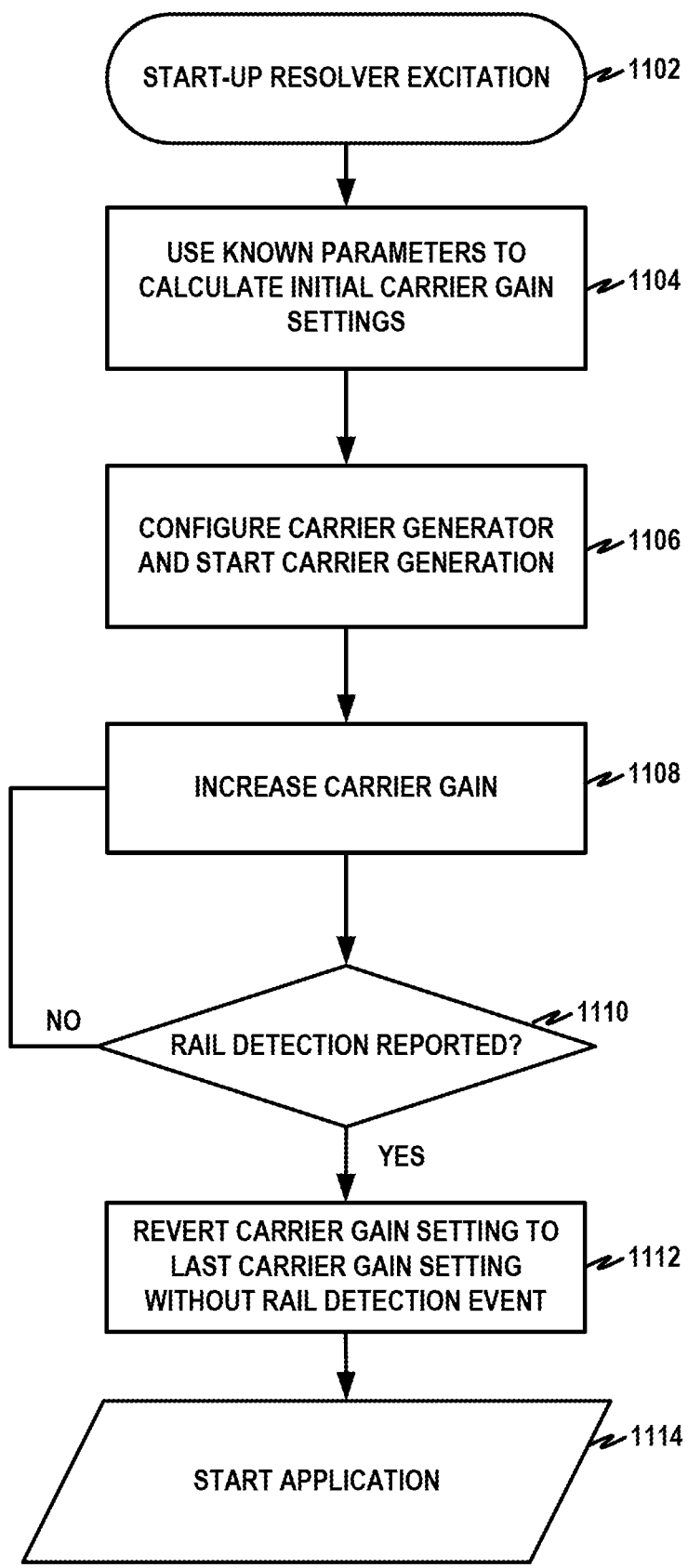
FIG. 11 is a flow diagram illustrating a start-up sequence to optimize the carrier amplitude prior to operating a motor in a steady-state operation, in accordance with this disclosure.

FIG. 11 is a flow diagram illustrating a start-up sequence to optimize the carrier amplitude prior to a steady-state operation, in accordance with this disclosure. FIG. 11 shows a start-up sequence to optimize an amplitude of an excitation signal prior to starting a motor.

In the example of FIG. 11, a system performs a start-up resolver excitation (1102) and uses known parameters to calculate an initial carrier gain setting (1104). For example, controller circuitry may determine an initial amplitude for the excitation signal based on a carrier signal configuration. The system may configure a carrier generator and start carrier generation (1106). The system may increase carrier gain (1108). The system may determine whether a rail detection is reported (1110). For instance, the system may determine whether the excitation voltage exceeds a threshold band of voltages using techniques described in FIG. 6. In response to no rail detection being reported ("NO" of step 1110), the system returns to step 1108. In response to a rail detection being reported ("YES" of step 1110), the system reverts the carrier gain setting back to a last known carrier gain setting without the rail detection event (1112) and starts an application (1114).

That is, to determine a second gain value for starting the application (e.g., operating in steady-state), circuitry 102 may be configured to generate, during a start-up operation, the second gain value to be greater than the first gain value when a voltage of the excitation signal does not exceed a combination of a first supply voltage and a first threshold and when the voltage of the excitation signal is less than a second supply voltage minus a second threshold (e.g., does not result in a rail detection reported).

While the above example uses rail detection to determine whether the excitation voltage exceeds a threshold band of voltages, other examples, may determine whether the excitation voltage exceeds a threshold band of voltages differently. For example, a system may determine whether the excitation voltage exceeds a threshold band of voltages using one or more peak detectors (see FIG. 8).

Figure 12:
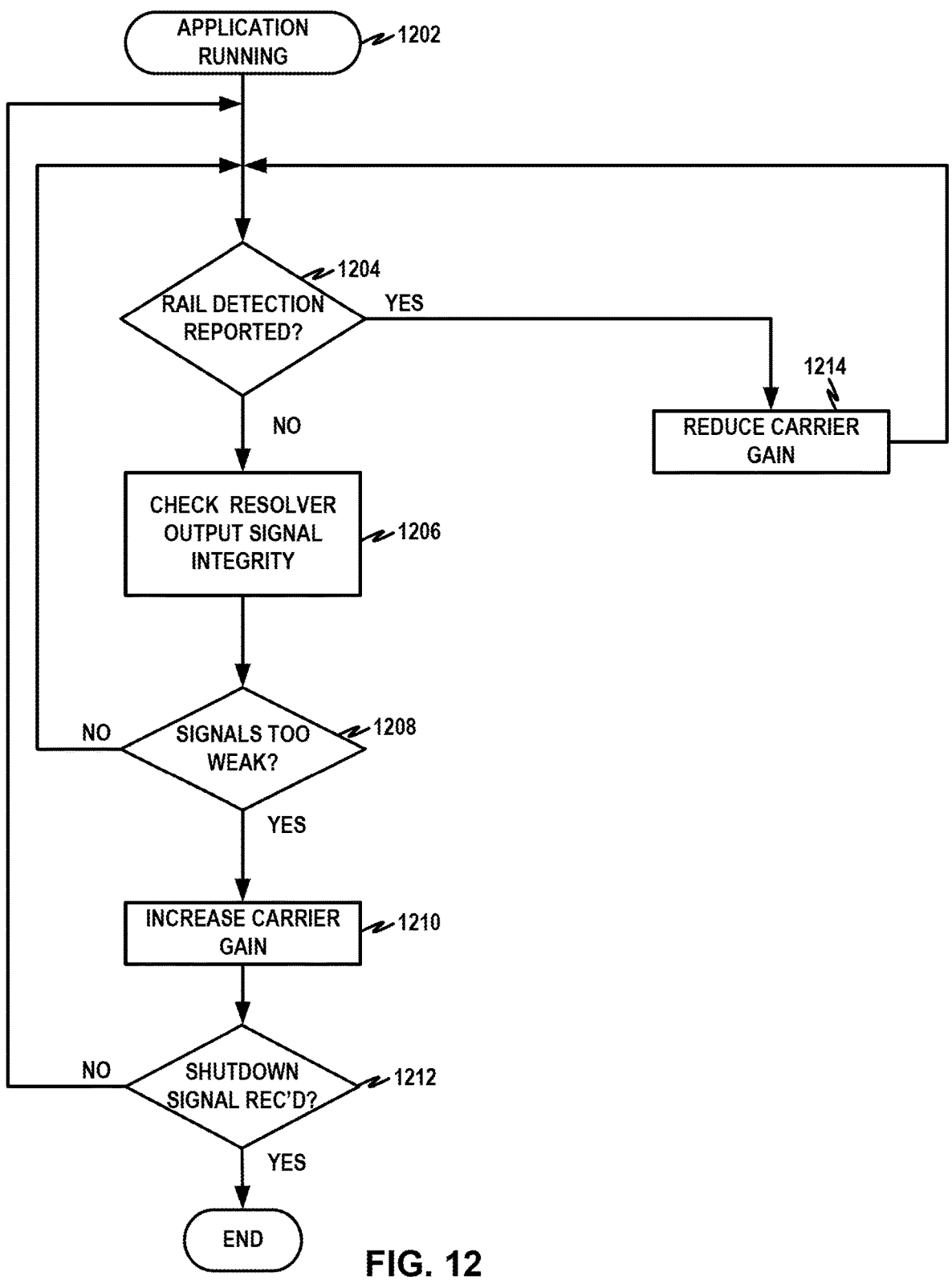
FIG. 12 is a flow diagram illustrating a process to maintain the optimum configuration during a steady-state operation, in accordance with this disclosure.

FIG. 12 is a flow diagram illustrating a process to maintain an optimum configuration during steady-state operation, in accordance with this disclosure. FIG. 12 describes a strategy to maintain a configuration during runtime. Optimum configuration may need some re-adjustment because application parameters may vary over time. During a runtime (e.g., during application running 1202), a system may try whenever the amplitude level of a sine sensing signal and a cosine sensing signal are weak to increase an amplitude of the excitation signal.

For example, the system may determine whether a rail detection is reported (1204). For instance, the system may determine whether the excitation voltage exceeds a threshold band of voltages using techniques described in FIG. 6. In response to a rail detection being reported ("YES" of step 1204), the system reduces the carrier gain (1214) and returns to step 1204. In response to no rail detection being reported ("NO" of step 1204), the system checks a resolver output signal integrity (1206) and determines whether the signal integrity is too weak (1208). The system may determine the signal integrity threshold by monitoring the excitation signal itself and/or comparing an amplitude of the excitation signal to a minimum required amplitude. In some examples, the system may determine the signal integrity by monitoring the amplitude of one or more sensing signal(s) on the sensing coils (e.g., sine sensing coil and cosine sensing coil). For instance, circuitry 902 may determine the signal integrity by monitoring the amplitude of one or more sensing signal(s) on the sensing coils. In some examples, controller circuitry 906 may determine the signal integrity by monitoring the amplitude of one or more sensing signal(s) on the sensing coils. For instance, controller circuitry 906 may determine the signal integrity using information used for numeric algorithms related to the angle computation.

In response to the signal integrity not being too weak ("NO" of step 1208), the system returns to step 1204. In response to the signal integrity being too weak ("YES" of step 1208), the system increases the carrier gain 1210 and determines whether a shutdown signal is received (1212). In response to not receiving a shutdown signal ("NO" of step 1212), the system returns to step 1204. In response to receiving a shutdown signal ("YES" of step 1212), the system shuts down.

While the regulation principles described in FIGS. 11 and 12 are directed to comparator-based examples, which have been discussed in FIG. 6, the regulation of the carrier signal amplitude can be even simplified when using the ADC based examples presented in FIG. 8. When using ADC based examples, the system could retrieve real-time quantitative information about the current excitation signal amplitude and can react accordingly. Retrieving real-time quantitative information about the current excitation signal amplitude may allow the system to react appropriately to variations of the resolver excitation circuits supply voltage before the excitation signal reaches the distortion region and/or boost the amplitude of the excitation signal immediately when the supply voltage recovers without "over-tuning" the excitation signal amplitude as described above.

That is, to determine a second gain value, circuitry 102 of FIG. 1 may be configured to generate, during a steady-state operation of the circuitry, the second gain value to be greater than the first gain value when a voltage of the excitation signal does not exceed a combination of a first supply voltage and a first threshold, when the voltage of the excitation signal is less than a second supply voltage minus a second threshold (e.g., when no rail detection is reported), and when the excitation signal comprises a voltage amplitude that is less than a signal integrity threshold (e.g., when the excitation signal is too weak).

Figure 13:
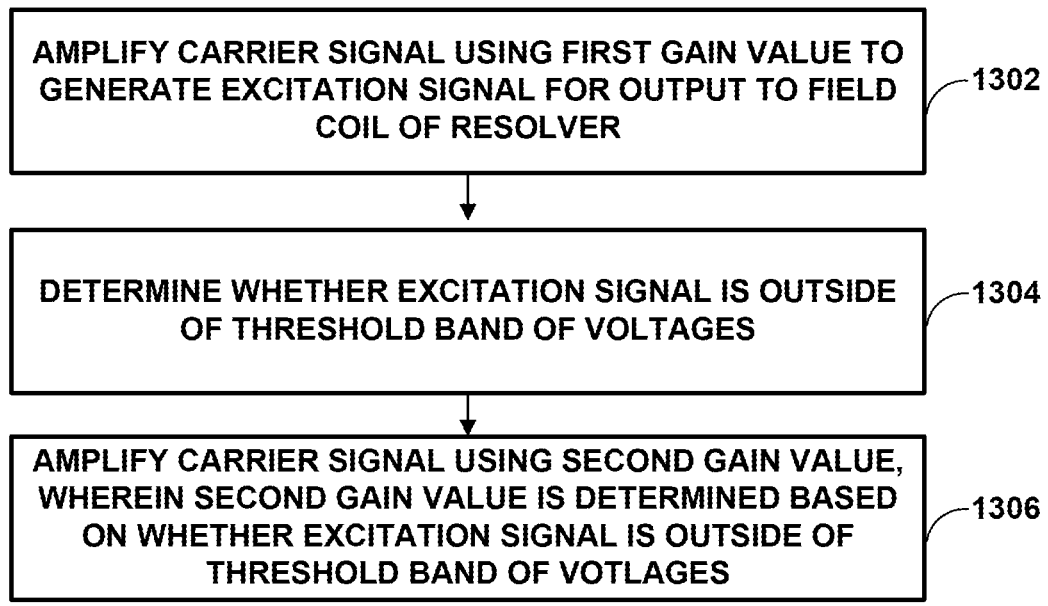
FIG. 13 is a flow diagram illustrating a method for excitation of a resolver comprising an excitation coil and one or more sensing coils, in accordance with this disclosure.

FIG. 13 is a flow diagram illustrating a method for excitation of a resolver comprising an excitation coil and one or more sensing coils, in accordance with this disclosure. FIG. 13 is discussed with reference to FIGS. 1-12 for example purposes only although the techniques of FIG. 13 may be used with other systems or devices.

In accordance with one or more techniques of this disclosure, amplifier 110 may amplify a carrier signal using a first gain value to generate an excitation signal for output to the excitation coil of resolver 104 (1302). For example, amplifier 110 may be configured to output the carrier signal into an input of a programmable operation amplifier of carrier amplifier 930 and set a gain of the programmable gain operation amplifier to the carrier setting gain value.

Excitation signal detector 112 may determine whether the excitation signal is outside of a threshold band of voltages (1304). For example, first comparator 670 may output, to controller circuitry (e.g., digital filter and evaluation circuitry 606) a high rail detection signal (e.g., rail_det_h) indicating that the excitation signal is in an upper distortion zone in response to determining that the excitation signal exceeds the threshold band of voltages. Similarly, second comparator 674 may output, to the controller circuitry, a low rail detection signal (e.g., rail_det_l) indicating that the excitation signal is in a lower distortion zone in response to determining that the excitation signal is less than the threshold band of voltages. In some examples, ADC 884 may output, to controller circuitry, an indication of a maximum voltage and/or a minimum voltage of an excitation signal during a period of time.

Amplifier 110 may amplify the carrier signal using a second gain value, wherein the second gain value is generated based on whether the excitation signal is outside of the threshold band of voltages (1306). For example, controller circuitry 906 may determine the second gain value during a start-up operation as described in FIG. 11. In some examples, controller circuitry 906 may determine the second gain value as described in FIG. 12 during a steady-state operation. Controller circuitry 906 may, in some examples, reduce the gain when the amplitude is higher than a maximum threshold value and reduce the gain when the amplitude is less than a minimum threshold value.

In some examples, circuitry 102 may determine the second gain value. For instance, circuitry 102 may determine the second gain value during a start-up operation as described in FIG. 11 and/or circuitry 102 may determine the second gain value as described in FIG. 12 during a steady-state operation. Circuitry 102 may, in some examples, reduce the gain when the amplitude is higher than a maximum threshold value and reduce the gain when the amplitude is less than a minimum threshold value.

The following examples may illustrate one or more aspects of the disclosure.

Example 1. A device for excitation of a resolver comprising an excitation coil and one or more sensing coils, the device comprising circuitry configured to: amplify a carrier signal using a first gain value to generate an excitation signal for output to the excitation coil of the resolver; determine whether the excitation signal is outside of a threshold band of voltages; and amplify the carrier signal using a second gain value, wherein the second gain value is generated based on whether the excitation signal is outside of the threshold band of voltages.

Example 2. The device of example 1, wherein, to determine whether the excitation signal is outside of the threshold band of voltages, the circuitry is configured to: determine whether a voltage of the excitation signal exceeds a combination of a first supply voltage and a first guard-band voltage; and determine whether the voltage of the excitation signal is less than a second supply voltage minus a second guard-band voltage.

Example 3. The device of any combination of examples 1-2, wherein, to determine whether the excitation signal is outside of the threshold band of voltages, the circuitry is configured to: output the excitation signal to a first input of a first comparator of the circuitry; output a first supply voltage to a second input of the first comparator; apply, with a first guard-band element of the circuitry, a first guard-band voltage that offsets a voltage at the first input of the first comparator or a voltage at the second input of the first comparator; output the excitation signal to a first input of a second comparator of the circuitry; output a second supply voltage to a second input of the second comparator; and apply, with a second guard-band element of the circuitry, a second guard-band voltage to offset a voltage at the first input of the second comparator or a voltage at the second input of the second comparator.

Example 4. The method of example 1, wherein the circuitry is further configured to: output, to controller circuitry, a high rail detection signal indicating that the excitation signal is in an upper distortion zone in response to determining that the excitation signal exceeds the threshold band of voltages; and output, to the controller circuitry, a low rail detection signal indicating that the excitation signal is in a lower distortion zone in response to determining that the excitation signal is less than the threshold band of voltages.

Example 5. The method of example 4, wherein the circuitry is further configured to receive, from the controller circuitry, an indication of the second gain value, wherein the controller circuitry generates the second gain value based on the high rail detection signal, the low rail detection signal, or both the high rail detection signal and the low rail detection signal.

Example 6. The method of any combination of examples 1-5, wherein the circuitry is further configured to determine the second gain value based on whether the excitation signal is outside of a threshold band of voltages.

Example 7. The method of example 6, wherein, to determine the second gain value, the circuitry is configured to generate the second gain value to be less than the first gain value when a voltage of the excitation signal exceeds a combination of a first supply voltage and a first threshold or when the voltage of the excitation signal is less than a second supply voltage minus a second threshold.

Example 8. The method of any combination of examples 6-7, wherein, to determine the second gain value, the circuitry is configured to generate, during a start-up operation of the circuitry, the second gain value to be greater than the first gain value when a voltage of the excitation signal does not exceed a combination of a first supply voltage and a first threshold and when the voltage of the excitation signal is less than a second supply voltage minus a second threshold.

Example 9. The method of any combination of examples 6-8, wherein, to determine the second gain value, the circuitry is configured to generate, during a steady-state operation of the circuitry, the second gain value to be greater than the first gain value when a voltage of the excitation signal does not exceed a combination of a first supply voltage and a first threshold, when the voltage of the excitation signal is less than a second supply voltage minus a second threshold, and when the excitation signal comprises a voltage amplitude that is less than a signal integrity threshold.

Example 10. The method of example 6, wherein, to determine whether the excitation signal is outside of the threshold band of voltages, the circuitry is configured to: determine a maximum voltage of the excitation signal during a predetermined period of time; and determine a minimum voltage of the excitation signal during the predetermined period of time.

Example 11. The method of example 10, wherein the circuitry is further configured to: output, to controller circuitry, an indication of the maximum voltage and an indication of the minimum voltage; and receive, from the controller circuitry, an indication of the second gain value, wherein the controller circuitry generates the second gain value based on the maximum voltage, the minimum voltage, or both the maximum voltage and the minimum voltage.

Example 12. The method of example 10, wherein the circuitry is configured to determine the second gain value based on the maximum voltage, the minimum voltage, or both the maximum voltage and the minimum voltage.

Example 13. The method of any combination of examples 1-12, wherein the one or more sensing coils comprises a sine sensing coil and a cosine sensing coil and wherein the second gain value is generated based further on a first amplitude of a sine sensing signal at the sine sensing coil, a second amplitude of a cosine sensing signal at the cosine sensing coil, or both the first amplitude and the second amplitude.

Example 14. The method of any combination of examples 1-13, wherein, to amplify the carrier signal using the first gain value, the circuitry is configured to output the carrier signal into an input of a programmable operation amplifier of the circuitry and set a gain of the programmable gain operation amplifier to the first gain value; and wherein, to amplify the carrier signal using the second gain value, the circuitry is configured to output the carrier signal into the input of the programmable gain operation amplifier and set the gain of the programmable operation amplifier to the second gain value.

Example 15. The method of example 14, wherein the circuitry is formed in a single integrated circuit.

Example 16. A method for excitation of a resolver comprising an excitation coil and one or more sensing coils, the method comprising: amplifying, by circuitry, a carrier signal using a first gain value to generate an excitation signal for output to the excitation coil of the resolver; determining, by the circuitry, whether the excitation signal is outside of a threshold band of voltages; and amplifying, by the circuitry, the carrier signal using a second gain value, wherein the second gain value is determined based on whether the excitation signal is outside of the threshold band of voltages.

Example 17. A system for excitation of a resolver comprising an excitation coil and one or more sensing coils, the system comprising: excitation circuitry configured to: amplify a carrier signal using a first gain value to generate an excitation signal for output to the excitation coil of the resolver; determine whether the excitation signal is outside of a threshold band of voltages; output an indication of whether the excitation signal is outside of the threshold band of voltages; and controller circuitry circuit configured to generate a second gain value in response to the indication of whether the excitation signal is outside of the threshold band of voltages, wherein the excitation circuitry is configured to amplify the carrier signal using the second gain value.

Example 18. The system of example 17, wherein the indication of whether the excitation signal is outside of the threshold band of voltages comprises a high rail detection signal indicating whether the excitation signal is in an upper distortion zone and a low rail detection signal indicating whether the excitation signal is in a lower distortion zone; and wherein the controller circuitry is configured to generate the second gain value based on the high rail detection signal, the low rail detection signal, or both the high rail detection signal and the low rail detection signal.

Example 19. The system of example 17, wherein the indication of whether the excitation signal is outside of the threshold band of voltages comprises an indication of a maximum voltage of the excitation signal during a predetermined period of time and an indication of a minimum voltage of the excitation signal during the predetermined period of time; and wherein the controller circuitry circuit is configured to generate the second gain based on the maximum voltage, the minimum voltage, or both the maximum voltage and the minimum voltage.

Example 20. The system of any combination of examples 17-19, wherein, to amplify the carrier signal using the first gain value, the excitation circuitry is configured to output the carrier signal into an input of a programmable operation amplifier of the excitation circuitry and set a gain of the programmable operation amplifier to the first gain value; and wherein, to amplify the carrier signal using the second gain value, the excitation circuitry is configured to output the carrier signal into the input of the programmable operation amplifier and set the gain of the programmable operation amplifier to the second gain value.

Various aspects have been described in this disclosure. These and other aspects are within the scope of the following claims.

The invention claimed is:

1. A device for excitation of a resolver comprising an excitation coil and one or more sensing coils, the device comprising circuitry configured to:
    amplify a carrier signal using a first gain value to generate an excitation signal for output to the excitation coil of the resolver;
    determine whether the excitation signal is outside of a threshold band of voltages, wherein, to determine whether the excitation signal is outside of the threshold band of voltages, the circuitry is configured to determine whether a voltage of the excitation signal exceeds a combination of a first supply voltage and a first guard-band voltage and determine whether the voltage of the excitation signal is less than a second supply voltage minus a second guard-band voltage; and
    amplify the carrier signal using a second gain value, wherein the second gain value is generated based on whether the excitation signal is outside of the threshold band of voltages.

2. The device of claim 1, wherein, to determine whether the excitation signal is outside of the threshold band of voltages, the circuitry is configured to:
    output the excitation signal to a first input of a first comparator of the circuitry;
    output the first supply voltage to a second input of the first comparator;
    apply, with a first guard-band element of the circuitry, the first guard-band voltage that offsets a voltage at the first input of the first comparator or a voltage at the second input of the first comparator;
    output the excitation signal to a first input of a second comparator of the circuitry;
    output the second supply voltage to a second input of the second comparator; and
    apply, with a second guard-band element of the circuitry, the second guard-band voltage to offset a voltage at the first input of the second comparator or a voltage at the second input of the second comparator.

3. The device of claim 1, wherein the circuitry is further configured to:
    output, to controller circuitry, a high rail detection signal indicating that the excitation signal is in an upper distortion zone in response to determining that the excitation signal exceeds the threshold band of voltages; and
    output, to the controller circuitry, a low rail detection signal indicating that the excitation signal is in a lower distortion zone in response to determining that the excitation signal is less than the threshold band of voltages.

4. The device of claim 3, wherein the circuitry is further configured to receive, from the controller circuitry, an indication of the second gain value, wherein the controller circuitry generates the second gain value based on the high rail detection signal, the low rail detection signal, or both the high rail detection signal and the low rail detection signal.

5. The device of claim 1, wherein the circuitry is further configured to determine the second gain value based on whether the excitation signal is outside of the threshold band of voltages.

6. The device of claim 5, wherein, to determine the second gain value, the circuitry is configured to generate the second gain value to be less than the first gain value when the voltage of the excitation signal exceeds a combination of the first supply voltage and a first threshold or when the voltage of the excitation signal is less than the second supply voltage minus a second threshold.

7. The device of claim 5, wherein, to determine the second gain value, the circuitry is configured to generate, during a start-up operation of the circuitry, the second gain value to be greater than the first gain value when the voltage of the excitation signal does not exceed a combination of the first supply voltage and a first threshold and when the voltage of the excitation signal is less than the second supply voltage minus a second threshold.

8. The device of claim 5, wherein, to determine the second gain value, the circuitry is configured to generate, during a steady-state operation of the circuitry, the second gain value to be greater than the first gain value when a voltage of the excitation signal does not exceed a combination of the first supply voltage and a first threshold, when the voltage of the excitation signal is less than the second supply voltage minus a second threshold, and when the excitation signal comprises a voltage amplitude that is less than a signal integrity threshold.

9. The device of claim 1, wherein the one or more sensing coils comprises a sine sensing coil and a cosine sensing coil and wherein the second gain value is generated based further on a first amplitude of a sine sensing signal at the sine sensing coil, a second amplitude of a cosine sensing signal at the cosine sensing coil, or both the first amplitude and the second amplitude.

10. The device of claim 1,
wherein, to amplify the carrier signal using the first gain value, the circuitry is configured to output the carrier signal into an input of a programmable operation amplifier of the circuitry and set a gain of the programmable gain operation amplifier to the first gain value; and
wherein, to amplify the carrier signal using the second gain value, the circuitry is configured to output the carrier signal into the input of the programmable gain operation amplifier and set the gain of the programmable operation amplifier to the second gain value.

11. The device of claim 10, wherein the circuitry is formed in a single integrated circuit.

12. A method for excitation of a resolver comprising an excitation coil and one or more sensing coils, the method comprising:
amplifying, by circuitry, a carrier signal using a first gain value to generate an excitation signal for output to the excitation coil of the resolver;
determining, by the circuitry, whether the excitation signal is outside of a threshold band of voltages, wherein determining whether the excitation signal is outside of the threshold band of voltages comprises determining whether a voltage of the excitation signal exceeds a combination of a first supply voltage and a first guard-band voltage and determining whether the voltage of the excitation signal is less than a second supply voltage minus a second guard-band voltage; and
amplifying, by the circuitry, the carrier signal using a second gain value, wherein the second gain value is determined based on whether the excitation signal is outside of the threshold band of voltages.

13. A system for excitation of a resolver comprising an excitation coil and one or more sensing coils, the system comprising:
excitation circuitry configured to:
amplify a carrier signal using a first gain value to generate an excitation signal for output to the excitation coil of the resolver;
determine whether the excitation signal is outside of a threshold band of voltages;
output an indication of whether the excitation signal is outside of the threshold band of voltages, wherein the indication of whether the excitation signal is outside of the threshold band of voltages comprises a high rail detection signal indicating whether the excitation signal is in an upper distortion zone and a low rail detection signal indicating whether the excitation signal is in a lower distortion zone; and
controller circuitry circuit configured to generate a second gain value in response to the indication of whether the excitation signal is outside of the threshold band of voltages, wherein the controller circuitry is configured to generate the second gain value based on the high rail detection signal, the low rail detection signal, or both the high rail detection signal and the low rail detection sign and wherein the excitation circuitry is configured to amplify the carrier signal using the second gain value.

14. The system of claim 13,
wherein, to amplify the carrier signal using the first gain value, the excitation circuitry is configured to output the carrier signal into an input of a programmable operation amplifier of the excitation circuitry and set a gain of the programmable operation amplifier to the first gain value; and
wherein, to amplify the carrier signal using the second gain value, the excitation circuitry is configured to output the carrier signal into the input of the programmable operation amplifier and set the gain of the programmable operation amplifier to the second gain value.

* * * * *